United States Patent
von Alten et al.

(10) Patent No.: US 6,847,367 B1
(45) Date of Patent: Jan. 25, 2005

(54) DISPLAY FOR PORT AREA OF ELECTRONIC EQUIPMENT

(75) Inventors: Thomas W. von Alten, Boise, ID (US); Carl R. Hoerger, Boise, ID (US); Jeffrey S. McAllister, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/121,745

(22) Filed: Jul. 23, 1998

(51) Int. Cl.[7] .................................................. G06T 1/60
(52) U.S. Cl. ...................................... 345/530; 345/905
(58) Field of Search ..................... 206/387.1; 360/131, 360/134; 235/380; 345/530, 50, 169, 905

(56) References Cited

U.S. PATENT DOCUMENTS

| | | | |
|---|---|---|---|
| 4,095,791 A | * 6/1978 | Smith et al. ............... | 273/85 G |
| 4,514,920 A | 5/1985 | Shafrir et al. .................. | 40/448 |
| 4,673,994 A | * 6/1987 | Hida ........................... | 360/85 |
| 4,797,542 A | * 1/1989 | Hara ........................... | 235/380 |
| 5,010,322 A | 4/1991 | Fry et al. ..................... | 340/700 |
| 5,021,763 A | 6/1991 | Obear ......................... | 340/407 |
| 5,027,111 A | 6/1991 | Davis et al. ................. | 340/784 |
| 5,051,868 A | 9/1991 | Leverault et al. ........... | 361/395 |
| 5,192,947 A | * 3/1993 | Neustein ................ | 340/825.44 |
| 5,248,193 A | 9/1993 | Schlemmer .............. | 312/223.2 |
| 5,351,176 A | 9/1994 | Smith Stephen W. et al. ............................. | 361/681 |
| 5,430,612 A | 7/1995 | Simon et al. ................ | 361/752 |
| 5,579,597 A | * 12/1996 | Stewart ....................... | 362/31 |
| 5,629,508 A | * 5/1997 | Findley, Jr. et al. ...... | 235/38 R |
| 5,689,610 A | * 11/1997 | Manico et al. ................. | 386/46 |
| 5,745,102 A | * 4/1998 | Bloch et al. ................. | 345/507 |
| 5,786,995 A | * 7/1998 | Coleman ..................... | 700/83 |
| 5,789,732 A | * 8/1998 | McMahon et al. ........... | 235/487 |
| 5,859,828 A | * 1/1999 | Ishibashi .................... | 369/771 |
| 5,915,261 A | * 6/1999 | Chan ........................... | 711/115 |
| 5,986,992 A | * 11/1999 | Bardmesser ................. | 360/133 |
| 6,019,284 A | * 2/2000 | Freeman et al. ............ | 235/380 |
| 6,021,944 A | * 2/2000 | Arakaki ....................... | 235/380 |
| 6,028,734 A | * 2/2000 | Matsui ....................... | 360/95.6 |
| 6,038,202 A | * 3/2000 | Kanatani et al. ........... | 369/77.2 |
| 6,069,851 A | * 5/2000 | Fenner .......................... | 369/1 |
| 6,144,549 A | * 11/2000 | Moss et al. ................. | 361/681 |

FOREIGN PATENT DOCUMENTS

| | | | |
|---|---|---|---|
| DE | 3925962 | * 2/1991 | |
| EP | 0505938 A | 9/1992 | |
| JP | 360266496 A | * 3/1987 | ................. 369/292 |

* cited by examiner

*Primary Examiner*—Xiao Wu
*Assistant Examiner*—Kevin Nguyen

(57) ABSTRACT

Embodiments of an electrical/electronic unit display system are described, which embodiments feature a dual-use for the port area of an electronic unit's exterior surface. Whereas a port area is normally used only for insertion of a cartridge or other data-storage container to cooperate with a data-retrieval drive, such as a reader or recorder, the invented system adapts the port area to also be used for display of information regarding the electronic unit and/or the cartridge itself. An exterior or otherwise-visible surface of the cartridge may be used for display, when the cartridge is in the port, the visible surface being readily observed by the equipment operator. Alternatively, the exterior or other visible surface of the port door may be used for display. The displays may be active, as in instrument faces built into the door and/or the cassette/cartridge. Or, the displays may be passive, as in a screen provided on the door and/or cassette/cartridge that reflects or transmits an image generated remotely by a prism or other transmitter. This way, the space required by the cassette, port or door may be effectively utilized also as a display, permitting the unit's "faceprint" to be minimized.

12 Claims, 6 Drawing Sheets

DISPLAY FOR PORT AREA OF ELECTRONIC EQUIPMENT

FIELD OF THE INVENTION

This invention pertains generally to electrical and electronic equipment, such as computers and readers/recorders of magnetic recording tape, CD, or disks, for example. More particularly, the invention relates to information display for equipment having a port area for temporarily receiving tape cassettes, cartridges, or the like.

The invention provides an information display that minimizes the "faceprint" surface area required for an electronic component, that is, the front surface or other surface facing the user for viewing. The invention provides a display on the port area, that is, either on 1) the cassette, cartridge, or other data container received in the port of the reader/recorder component; or 2) on the outer surface of the door covering the port of the component. In addition, the invention comprises data containers that include user-reconfigurable electronic displays and memory for storing container-specific information, such as the condition, history, and identification of the container.

BACKGROUND OF THE INVENTION

The goal of not requiring excessive space for equipment has become important for designers in the computer industry. The demands of many users for many pieces of peripheral equipment require that such equipment not overwhelm the limited work space available in most laboratories and offices.

One aspect of this space limitation has long been recognized by computer designers as the "footprint" limitation, that is, how much floor, counter or desk horizontal area the unit requires. Compactness and a vertical arrangement of elements in a unit contribute to the unit being smaller in its horizontal width and depth, and hence, to having a smaller footprint.

Another aspect of the space limitation is how much exterior, vertical display area is available conveniently to the user, in that the front, vertical surface of a unit or its modular counterpart is most conveniently viewed by the user. Utilizing units with smaller front, vertical surface areas results in the information from each of many peripheral units being conveniently visually perceived, or results in several modular units being combinable into a single housing with desirable dimensions. In oil refineries and industrial power plants, for example, this space limitation is addressed by localized control panels and rooms that display information, gathered from remote sensors and instruments, in banks or groupings of read-outs, lights, and/or strip-charts. For computer equipment designers, this local display of remote unit information is usually not available, however, so the vertical surface limitation, coined by these inventors as the "faceprint" limitation, refers to how much vertical area the unit requires, including surface area for housing of interior elements and also area for information display.

One example of a front-surface-saving display is found in U.S. Pat. No. 5,351,176 (Smith, et al.), which discloses a front panel display for a computer. The front panel has a pivotal display which swings out of the way like a door to provide access to the internal components of the computer for replacement and/or repair. This way, the computer can have the display as well as the access to its internals, and not require excessive space, for example, in a rack utilized to house the computer and other equipment associated with it.

There is still a need for display systems that minimize the surface area required for user viewing. Also, there is a need for a non-paper system of non-permanent labeling for computer data containers such as tape cassettes or cartridges, which is updatable by the user. The present invention, in its various embodiments, satisfies all or many of these needs.

SUMMARY OF THE INVENTION

The present invention comprises dual-use for the exterior space on an electrical/electronic unit that is normally allotted only for receiving a cassette, cartridge, CD, disk or other data container. The second use, according to the invention, comprises displaying information on an exterior panel port area, that is, the outer surface of the port door that covers or partially covers the port that receives a data container or the outer or other visible surface of the data container received in the port. Thus, the invented display system does not require additional faceprint area, but allows the equipment operator to readily observe a large and clear display. The displayed information may relate to the electronic unit receiving the data container and/or to the data container itself. Such dual-use of a port area reduces the square inches of front or top exterior surface needed for a piece of equipment, and, thus, the faceprint of the unit may be reduced. The unit usually fits better on a desk or counter, or the unit may be attached in modular or integral fashion to another piece of equipment, such as a CPU, without greatly increasing the faceprint of the combined unit.

The displays of this invention may be active, as in an instrument face built into the door or into a facet of the data container. Alternatively, the displays may be passive, as in a screen provided on the door or on the data container that reflects or transmits an image generated remotely. For example, a prism system on the door or on a cassette end surface may be used to receive and reflect a display image that will appear to be coming from the door or cassette.

In the various embodiments of the invention, the port area once used as only a receiving area for a cassette, cartridge, CD, or other data container may now also display information pertinent to the electronic unit or to the data container. When a port area is adapted to include a display, a large magnetic tape cassette or cartridge in a compact mechanism, for example, allows larger and/or more numerous and readable characters to be displayed, compared to a mechanism where the display is cramped onto a surface area beside the port.

Many embodiments of this invention result in a cassette, cartridge, or other data container that may carry with it an electronic display or label specific to that container. The electronic display/label may be reconfigured by the user or the electronic unit's firmware, when the container is received in the unit. Such a user-reconfigurable container label allows container-specific information to be stored on the container when it is not in use, and then to be displayed and/or updated when the container is used again.

DETAILED DESCRIPTION OF THE PREFERRED EMBODIMENT

Referring to the Figures, there are shown several, but not the only, embodiments of the invented display for a data container port area of an electronic device. FIGS. 1 and 3–5 show, in general, how the exterior space conventionally used only to receive and/or cover a tape cartridge or cassette, for example, may be adapted for a second use, that is, display of information pertaining to the operation of a recording/reading unit or pertaining to the cartridge or cassette itself. FIG. 2 schematically illustrates container-specific labels on data containers, according to this invention, that are established and/or revised via the software and/or firmware of the electronic recording/reading unit, and that may reside in memory on the each data container during storage for reading/revision at a later time.

Figure 1A:
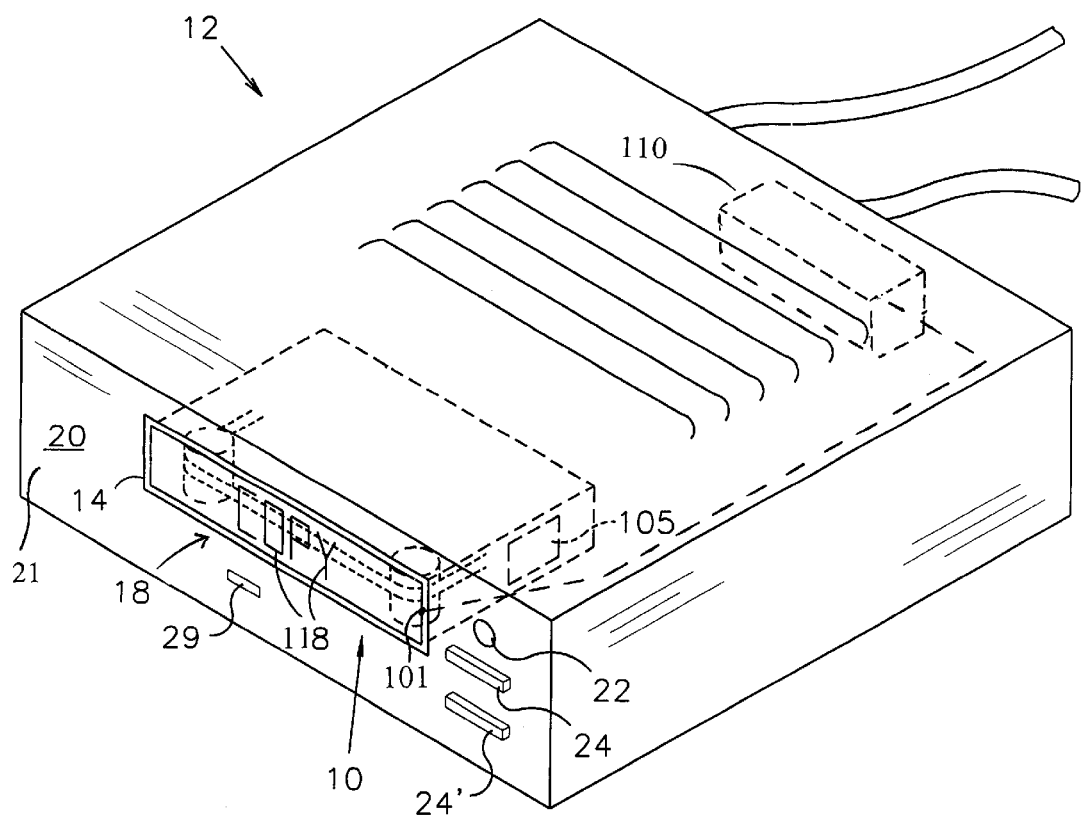
FIG. 1A is a perspective view of a computer cassette or cartridge in a peripheral reading device and including a display on/in its surface, according to one embodiment of the present invention.
Figure 2:
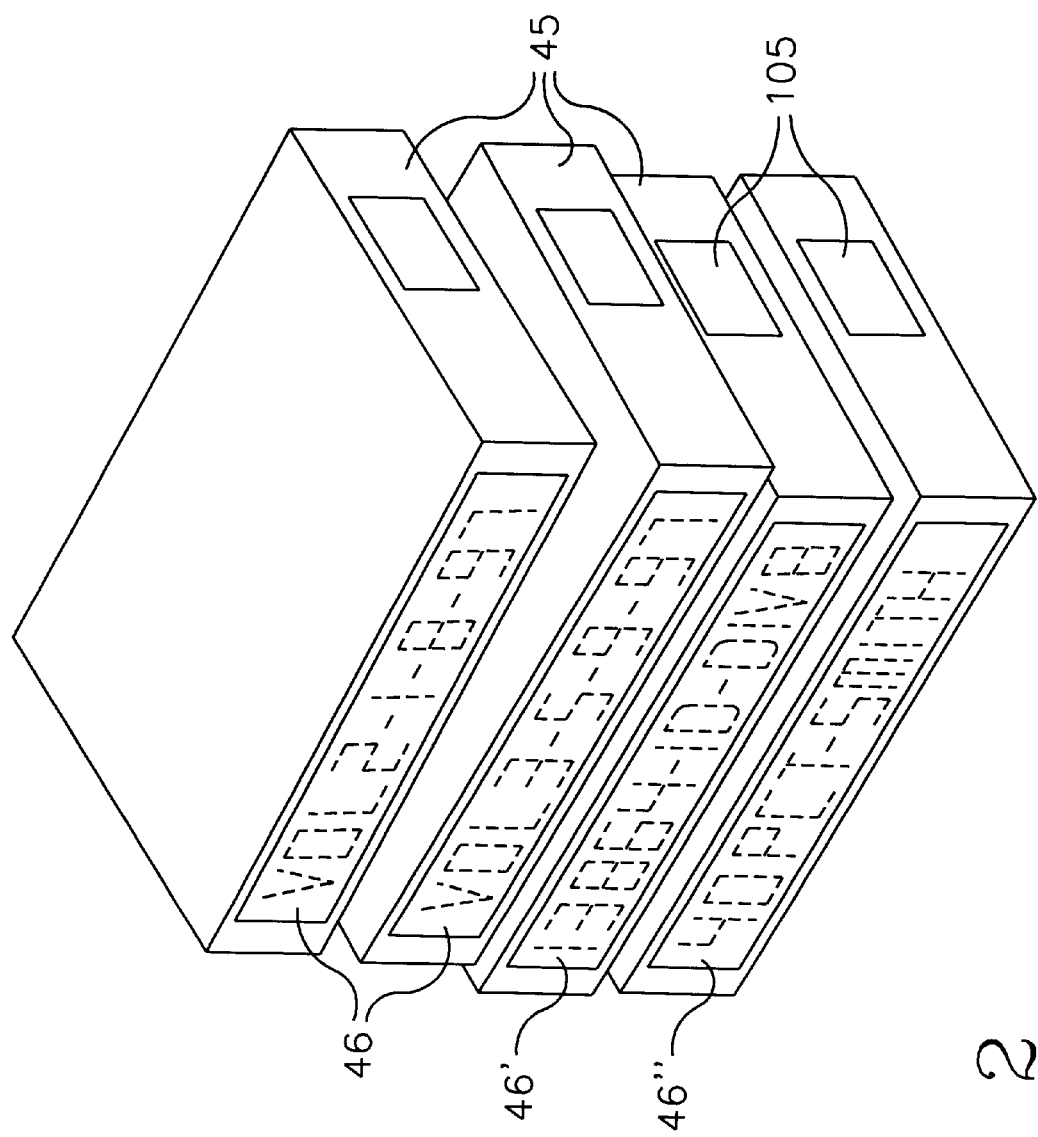
FIG. 2 is a perspective view of a plurality of data containers with reconfigurable electronic labels shown schematically on their surfaces.

In FIG. 1A is depicted a perspective view of a computer cartridge 10 in a first reading (or recording) peripheral device 12. Cartridge 10 is inserted into first peripheral device 12 through a port, an edge of which port is visible at 14. Cartridge 10 is shown to have an end surface with display 18, which is generally flush with front surface 20 of the housing 21. Alternatively, the device may be of the types adapted to receive a cartridge further into the port or less far in the port, that is, so that the cartridge end surface is recessed in the port or protrudes from the port, respectively. All that is necessary is that the cartridge display surface be visible to the user.

In FIG. 1A, the display 18 is displaying the term "COPY." The display 18 may be liquid crystal display (LCD), light-emitting diode (LED) 118 or another display means. The front surface 20 of first peripheral device 12 may also have other indicators, for example on-off light 22, and other function lights 24 and 24', and eject button 29. With nearly all of the display area that is required being on the end of the cartridge 10, the housing may be reduced to a minimum size needed for housing the cartridge and the internal components. Alternatively, the front surface of the housing may include permanent nameplates or other decorations or indicia.

Figure 1B:
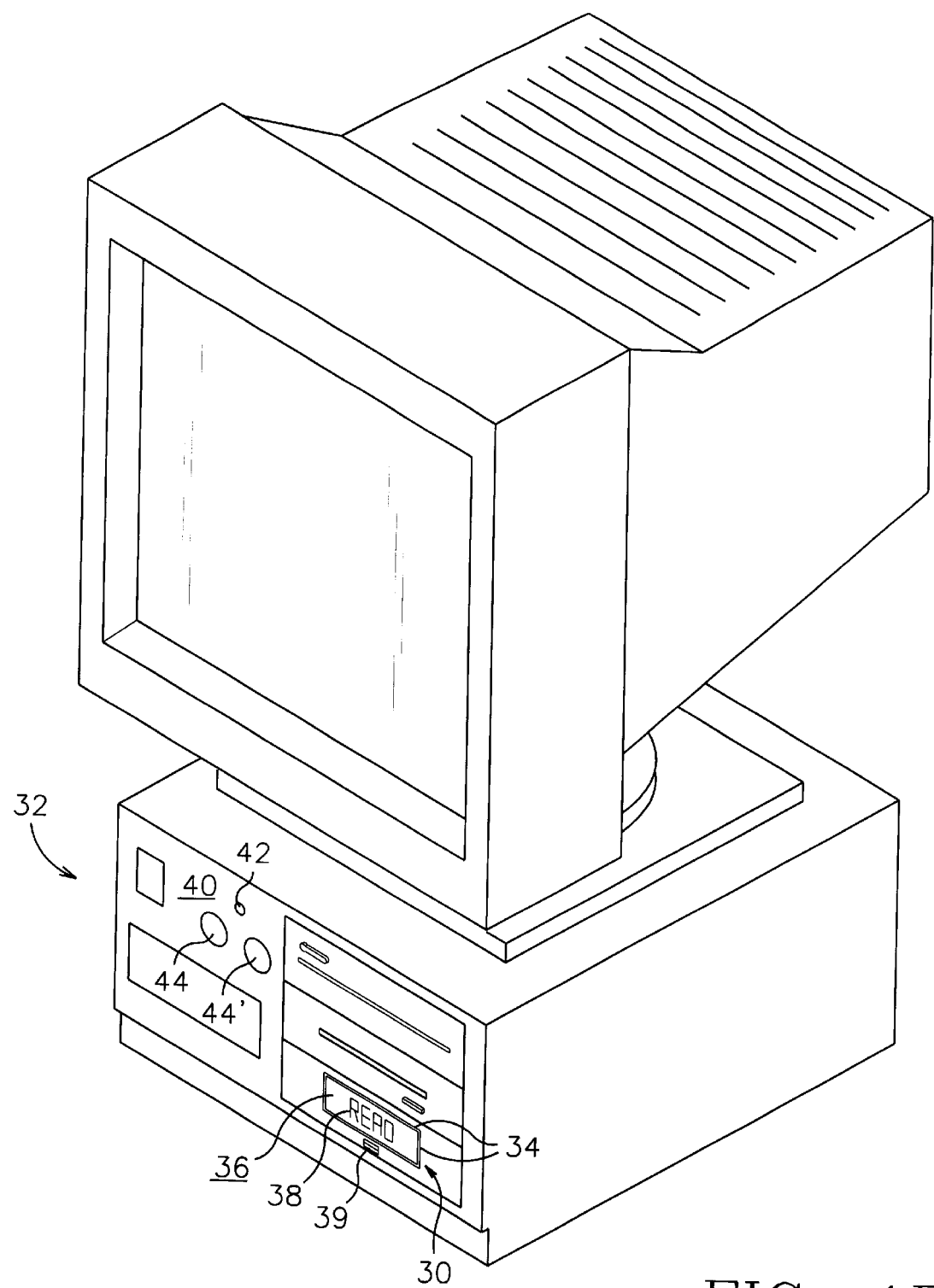
FIG. 1B is a perspective view of another computer cassette or cartridge with display, according to the invention, which is a modular portion of a CPU.

In FIG. 1B is depicted a perspective view of a computer cassette 30 in a first modular personal computing (PC) device 32. Cassette 30 is inserted into first PC 32 device through a port, an edge of which port is visible at 34. Cassette 30 has an extending visible end surface 36 which has display 38, in this case displaying the term "READ", but may display a variety of words and/or numbers. The front surface 40 of first PC device 32 may also have other indicators, for example on-off light 42, and other function lights 44 and 44', and eject button 39. It may be seen that the cassette 30 provides a large enough surface area for comfortable viewing of one or more full words by the user and/or several numbers. As discussed above, the cassette or cartridge outermost surface may be flush, recessed, or protruding relative to the front surface 40 of the unit. Placing the display 38 on the cartridge or cassette creates a comfortable and reasonable "focal point" for the user, that is, the cartridge or cassette being watched as it is manipulated is also the location to be watched for display of information.

In FIG. 2, a plurality of data containers 45 are shown, with their user-configurable displays 46, 46', 46" shown schematically. This illustrates how the containers may comprise memories and display means for storing and displaying container-specific information, such as volume number, date last accessed, inventory number, title, etc. Preferably, this container "i.d." and "history" information is stored on a memory chip on/in the container. The display may not be powered and therefore not visible when the containers are ejected from the electronic unit, because the container preferably does not include a power source. Alternatively, the container may include means for continuing display of the last-stored label even when the container is separate from the electronic unit, such as a battery or solar-powered cell, or by using a "zero-power" bi-stable LCD. Zero-power LCD's that might be used in some embodiments of the invention are available from Kent Displays Incorporated (at http://kentdisplays.com), which company offers "no power, high-contrast cholesteric digital displays" and "low power" information displays, for airport or highway signs, cellular phones, pagers, and point-of-sale displays.

Thus, the electronic user-reconfigurable display system does not require handwritten or typed labels. The electronic display system allows large numbers of data containers to be stored, each holding its own means for displaying its title, contents, history (i.e., date first used, date last used, by whom used, etc.), or inventory number, which may be quickly viewed on the container's own display and/or revised when the container is inserted again into the original or alternative reader/recorder. Such a system may be valuable for those handling a magazine of cartridges or other data collections for corporate records, library catalogs, or other data banks.

The containers of this invention, therefore, may be described as any containers that may be temporarily inserted into an electronic unit for temporary connection to the hardware and associated firmware and software of the unit. The container's electronically-transmitted display is adapted for temporary connection 101 to a power source 110 for providing information to a user of the container or of the electronic unit, and the container preferably does not comprise a data-retrieval drive, but is adapted to be received by a data-retrieval drive. Preferably, the containers are data-storage containers that do not contain any power source, any tape-drive or other data-retrieval drive, or any apparatus except: data storage means, an optional memory chip, and the structure necessary for cooperation with a tape-drive or other drive, and, optionally, the structure for cooperation with means to store information on the memory chip. In other words, the containers of this invention are preferably not self-contained data recording/reading devices, but rather the magnetic tape, CD, or other discrete packages of data that are inserted interchangeably into a port of a recording/reading device. The term "data retrieval drive", therefore, refers to disk, CD, or tape drives, and any mechanical, magnetic, laser, or other means for operatively contacting the data-storage surface (tape, CD, or disk surface, etc) to read or store data/information on the surface. Thus, "data-retrieval drive" refers to the machine that receives and records/reads/plays the container of data or information, rather than the container itself.

Figure 3:
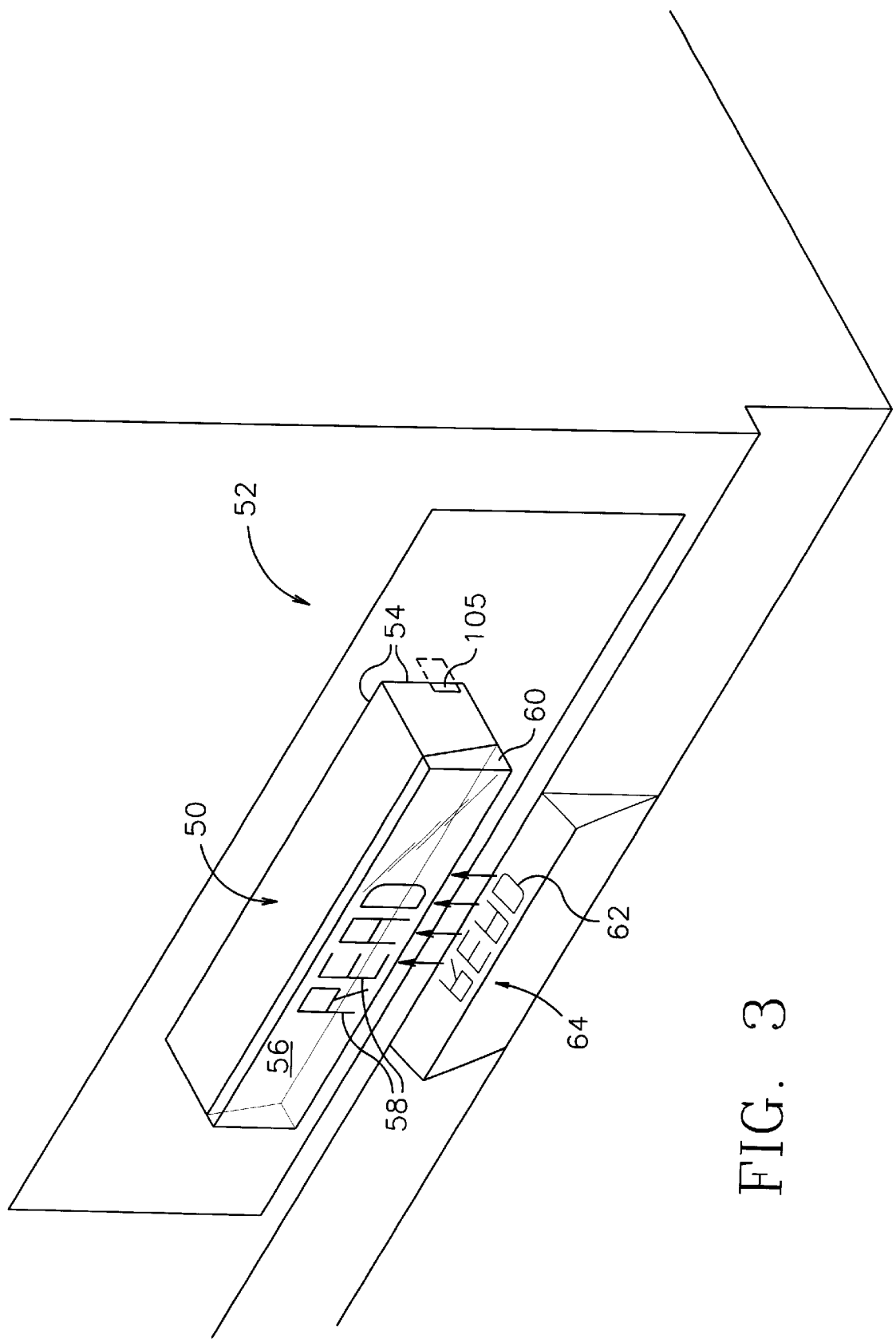
FIG. 3 is a partial detail, perspective view of another embodiment of the invention, that is, an example of a passive display.

In FIG. 3 is depicted a partial, detail, perspective view of another embodiment of the invention, a cassette 50 in a second PC device 52. Cassette 50 is inserted into second PC device 52 through a port, an edge of which port is visible at 54. Cassette 50 has a visible end surface 56 which has passive display 58, in this case displaying the term "READ." End surface 56 comprises slightly the front surface of passive display screen 60, which is attached to cassette 50 and may protrude from the device, as shown, or may be flush or even slightly recessed, as long as the emissions from the active display can reach the screen 60. Passive display screen 60 merely relays in mirror-like fashion the active display 62 transmitted to passive screen 60 by active display transmitter 64. Transmitter 64 is attached to second PC device 52 below the cassette 50, or, optionally, may be attached to other areas of the device 52 near the port or inside the port close to the port opening. Thus, screen 60 is preferably a material with suitable optical transmission and reflection properties on its different surfaces, such as a prism. Active transmitter 64 may be a conventional LED device, for example, adapted to project or direct a mirror image of the desired words/numerals toward the prism screen 60, with transmitter 64 and screen 60 positioned so that the reflection is easily read from screen 60.

Figure 4:
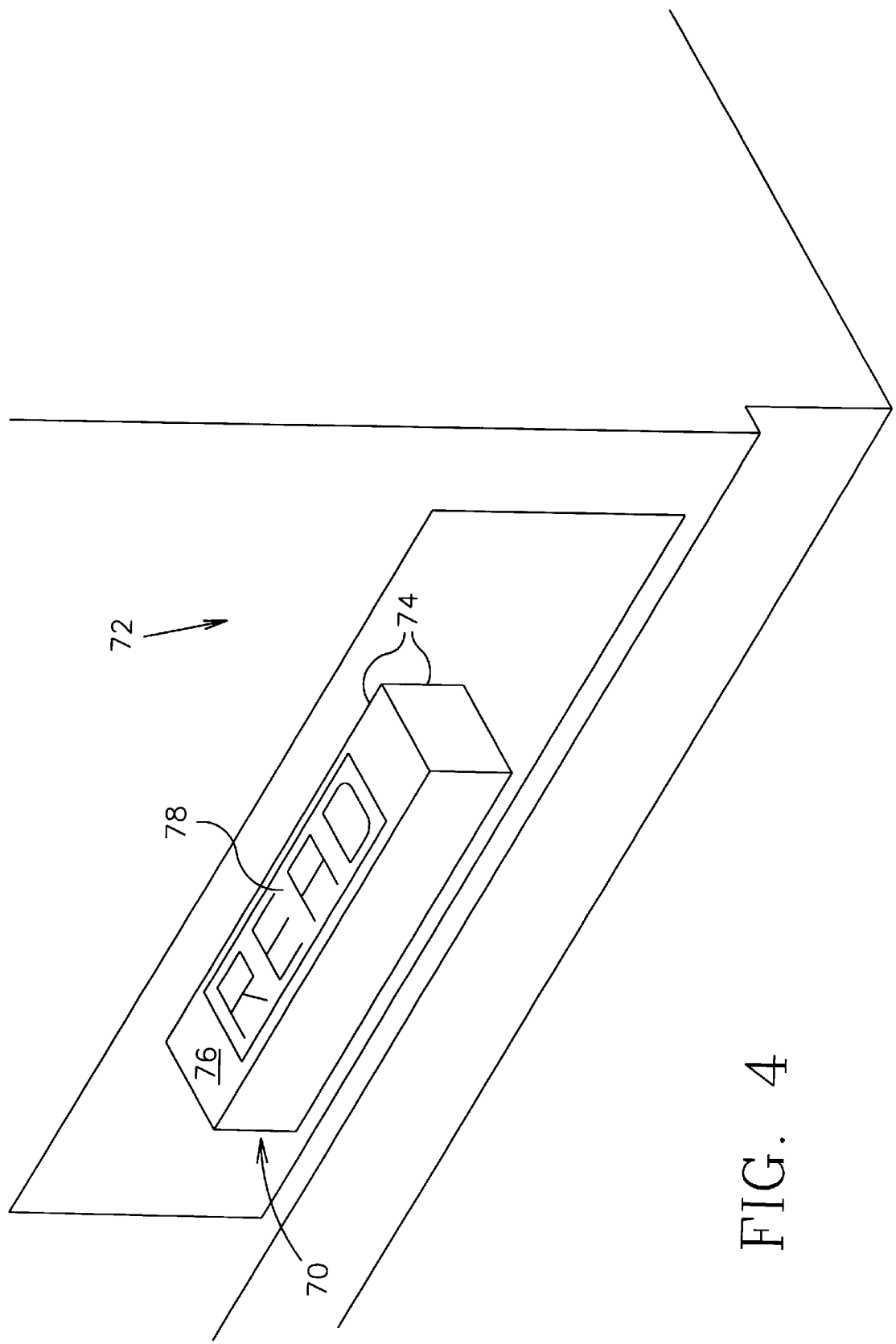
FIG. 4 is a partial, detail, perspective view of an alternative active display embodiment of the invention.

In FIG. 4 is depicted a partial, detail, perspective view of another embodiment of the invention, cassette 70 in a third PC device 72. Cassette 70 is inserted into third PC device 72 through a port, an edge of which port is visible at 74. Cassette 70 has a protruding end with visible top surface 76 that has active display 78, in this case displaying the term "READ." Top surface 76 and display 78 are easily viewed by the user, depending on the location of cassette 70 and third PC device 72 relative to the user, and may be for use with "tower" CPUs, for example, which are often placed on the floor.

Figure 5:
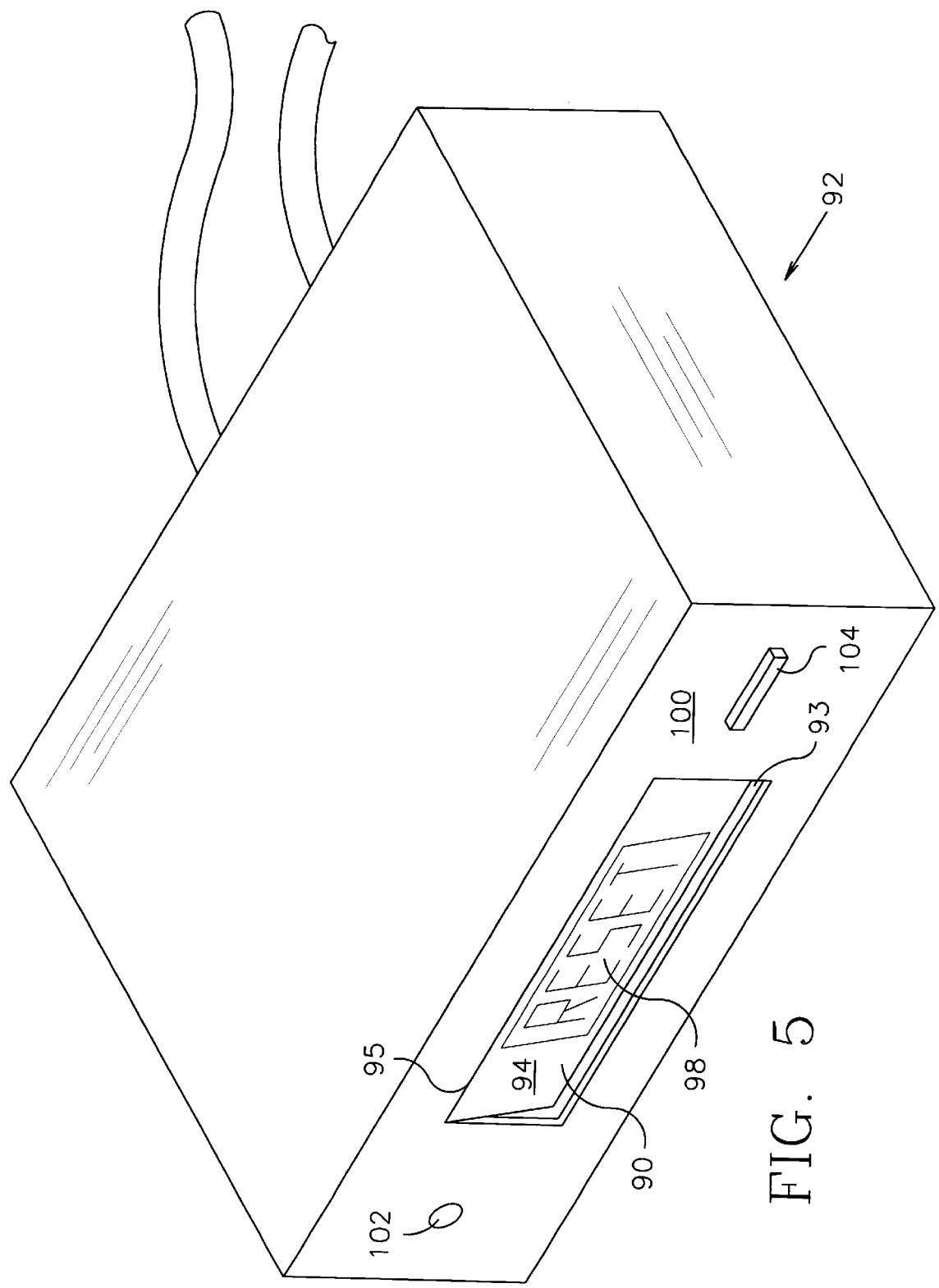
FIG. 5 is a perspective view of another embodiment of the present invention, a cassette or cartridge port door with a display.

In FIG. 5 is depicted a perspective view of a cassette or cartridge port door 90 in a second reading peripheral device 92. Door 90 preferably extends to cover substantially the entire port 93 that receives the cassette or cartridge (not shown in FIG. 5), thus offering a large surface area for display. The door 90 preferably has a hinge (not shown) at its top end 95 for permitting door 90 to pivot and swing inwardly when force is exerted on door front surface 94. This way, door 90 and second peripheral device 92 may receive a cassette or cartridge through port (opening) 93 created when door 90 swings inwardly. Display 98 is provided on door front surface 94, in this case displaying the term "RESET." In this case, it is not necessary that the cassette or cartridge in the port have a visible surface extending out from port 93 when completely installed, although the provision of this additional feature may be optional, and may include optional additional display on the cassette or cartridge. The front surface 100 of second peripheral device 92 may also have other indicators, including on-off light 102 and function light 104.

As stated above, the display may be adapted to show real time data about the operation of the unit, or stored and/or updated data about the cartridge, cassette or container in use. Information about the unit operation may be gathered by conventional means in the unit, such as signals reporting whether the data container is undergoing the processes of "read", "record", "copy", "save", or "copy", etc.

The container-specific information stored on the container may include volume number, title of cartridge/cassette, inventory number, date accessed, person last accessing, specifications of the tape, or tape age, for example. Cartridge/cassette-specific information may be recorded on a memory chip on the individual cartridge/cassette or other container. An example of a memory chip 105 that might be used on the cassette/cartridge is the Philips MIFARE™ system being described by international standard ISO-14443-2. A cartridge reader may query the memory chip, via a temporary connection, that is, a temporary contact or temporary electromagnetic transmitter/receiver arrangement between the cartridge/cassette and the chip reader. The temporary connection preferably is operative whenever the cartridge/cassette is installed in the port, and is inactive or unused when the cartridge/cassette is removed.

In cases where the active display is on the cartridge/cassette surface, another temporary connection may be made between the unit and cartridge/cassette to deliver to the cartridge/cassette the processed information to be displayed. In cases where the display signals are delivered to an active transmitter in/on the unit (but not on the cartridge/cassette) for reflection off of the passive cartridge/cassette or door, conventional means may be used to deliver the display signals to the active transmitter on/in the unit. In cases where the display signals are delivered to an active display on a door, conventional means may be used for delivery to the door, except for the addition of a ribbon cable or flex circuit across the hinge of the door, which is adapted to withstand the repeated movement of the door without damage.

In the following claims, the term "electronic unit" is intended to include any piece of equipment for handling a tape, cartridge or cassette, or other data container that is, including recording, reading, winding, erasing, or even reading of only a memory chip on the container without accessing the tape, disk or other data in the container, etc.

Although this invention has been described above with reference to particular means, materials and embodiments, it is to be understood that the invention is not limited to these disclosed particulars, but extends instead to all equivalents within the scope of the following claims.

What is claimed is:

1. A data-storage container for insertion into a port of an electronic unit, the electronic unit having an exterior surface, and said port opening through said exterior surface, the container comprising:

a visible surface that is visible by a user of the electronic unit when the container is inserted in the port;

an electronically-transmitted display on the visible surface, said display having a temporary connection for being connected to a power source and said display providing information comprising a process name stating what process the electronic unit is conducting on the container to a user of the electronic unit or the container; and wherein the container does not comprise a data-retrieval drive, but is adapted to be received by a data-retrieval drive; and wherein the container does not comprise a power source within the container, wherein said temporary connection is adapted for connection to a power source within said electronic unit, so that, when said container is ejected from said electronic unit, the electronically-transmitted display is not powered and the information provided by said display is not visible to the user.

2. The date-storage container of claim 1, which is a magnetic recording tape cassette/cartridge for insertion into a tape reading unit.

3. The date-storage container of claim 1, which further comprises a memory chip.

4. The data-storage container of claim 1, wherein the electronically-transmitted display comprises words describing data recording in the container.

5. The data-storage container of claim 1, wherein the electronically-transmitted display comprises numbers describing data recorded in the container.

6. The data-storage container of claim 1 wherein said displayed process name comprises the word "read."

7. The data-storage container of claim 1 wherein said displayed process name comprises the word "reset."

8. The data-storage container of claim 1 wherein said displayed process name comprises the word "copy."

9. A combination of a data-storage container and electronic unit, said data-storage container being insertable into a port of an electronic unit, the electronic unit having an exterior surface and a port opening through said exterior surface, the container comprising:

an top surface, bottom surface, and an end surface, wherein said end surface is visible by a user of the electronic unit when the container is inserted in the port;

an electronically-transmitted display on said end surface, said display having a temporary connection connected to a power source and providing information comprising a process name stating what process the electronic unit is conducting on the container to a user of the electronic unit or the container; and wherein the container does not comprise a data-retrieval drive, but is adapted to cooperate with a data-retrieval drive; and wherein the container does not comprise a power source within the container, so that, when said container is ejected from said electronic unit, the electronically-transmitted display is not powered and the information provided by said display is not visible to the user.

10. The data-storage container of claim 9 wherein said displayed process name comprises the word "read."

11. The data-storage container of claim 9 wherein said displayed process name comprises the word "reset."

12. The data-storage container of claim 9 wherein said displayed process name comprises the word "copy."

* * * * *